INVENTORS.
ALBERT E. TOMMARELLO &
BENGT H. SODERQUIST
BY Bosworth, Sessions,
Herrstrom & Cain
ATTORNEYS INVENTORS.
ALBERT E. TOMMARELLO &
BENGT H. SODERQUIST
BY *Bosworth, Sessions,
Herrstrom & Cain*
ATTORNEYS INVENTORS.
ALBERT E. TOMMARELLO &
BY BENGT H. SODERQUIST
Bosworth, Sessions,
Herrstrom & Cain
ATTORNEYS

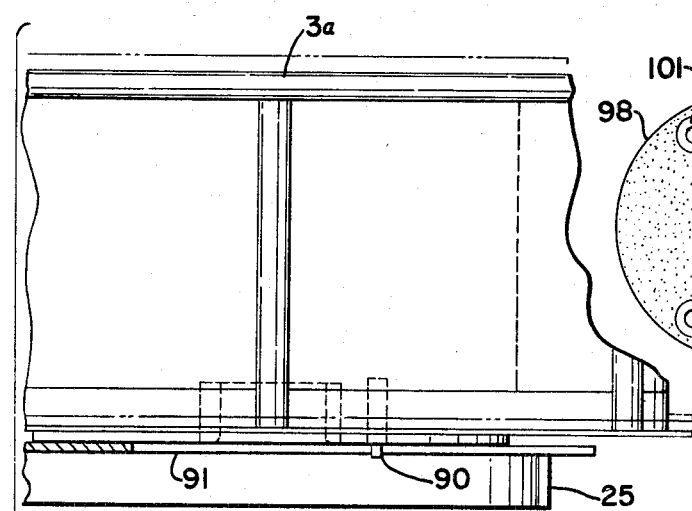
FIG. 7
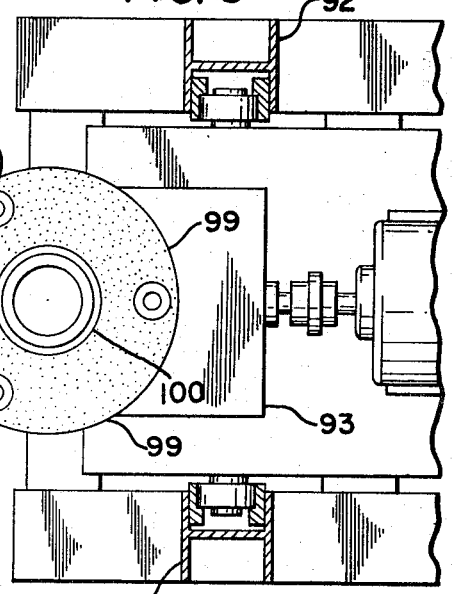
FIG. 8
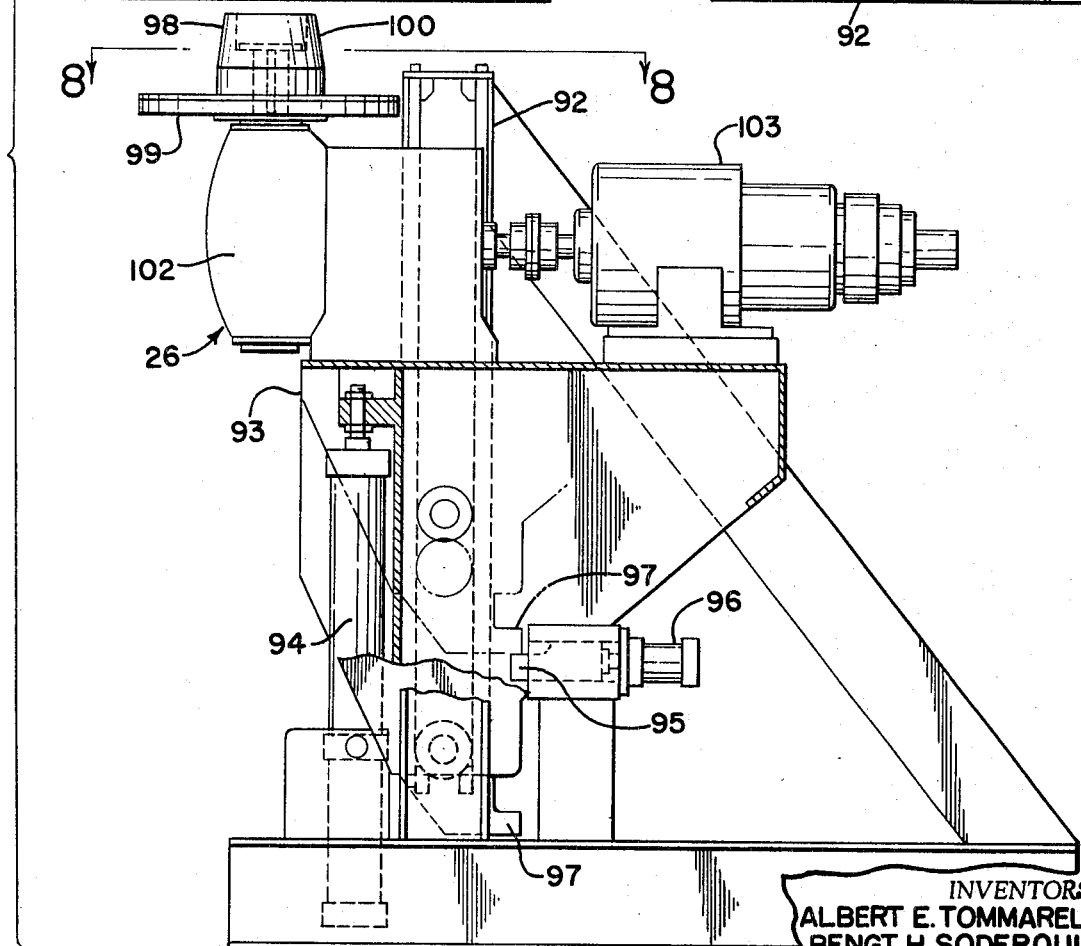
INVENTORS.
ALBERT E. TOMMARELLO &
BENGT H. SODERQUIST
BY Bosworth, Sessions,
Herrstrom & Cain
ATTORNEYS

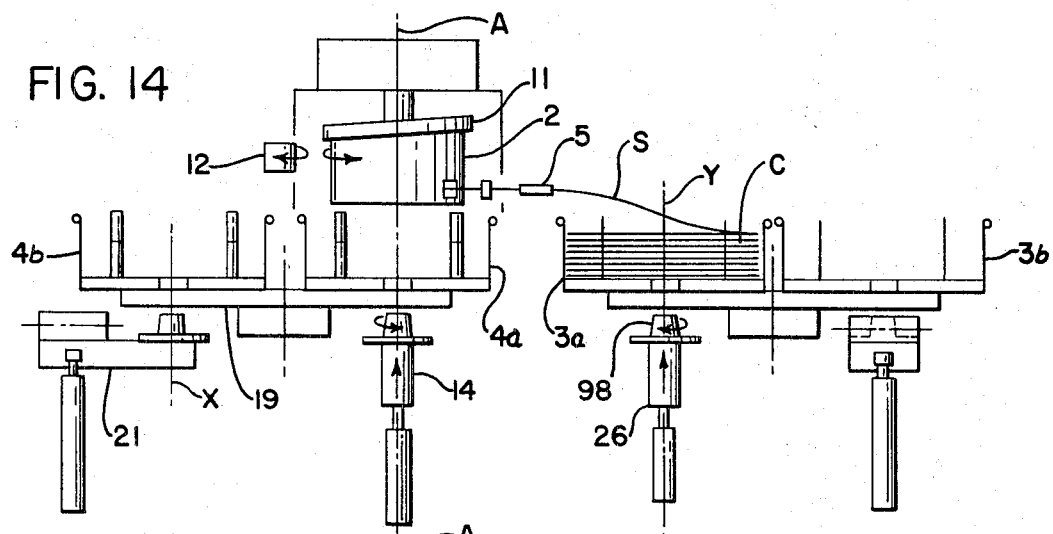
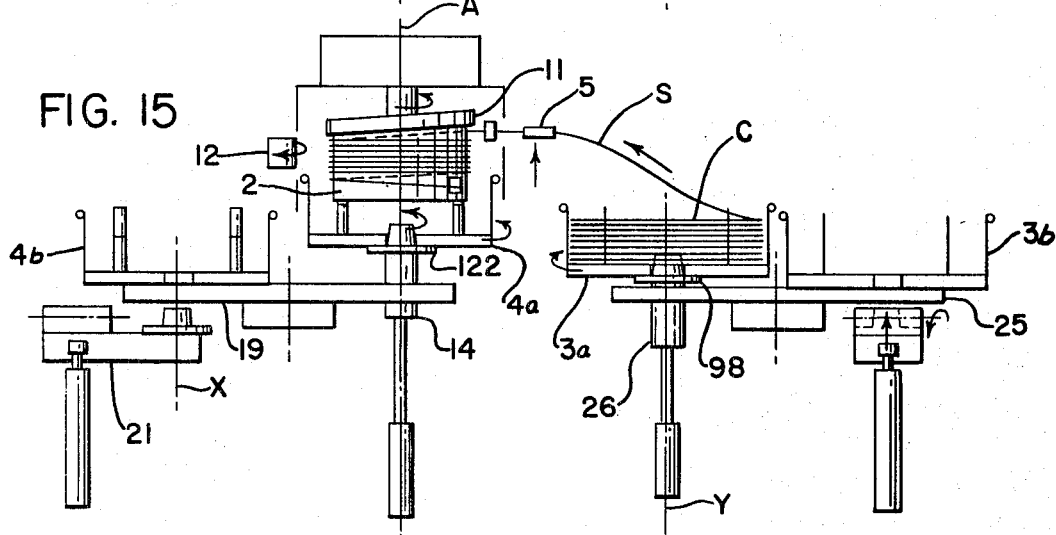
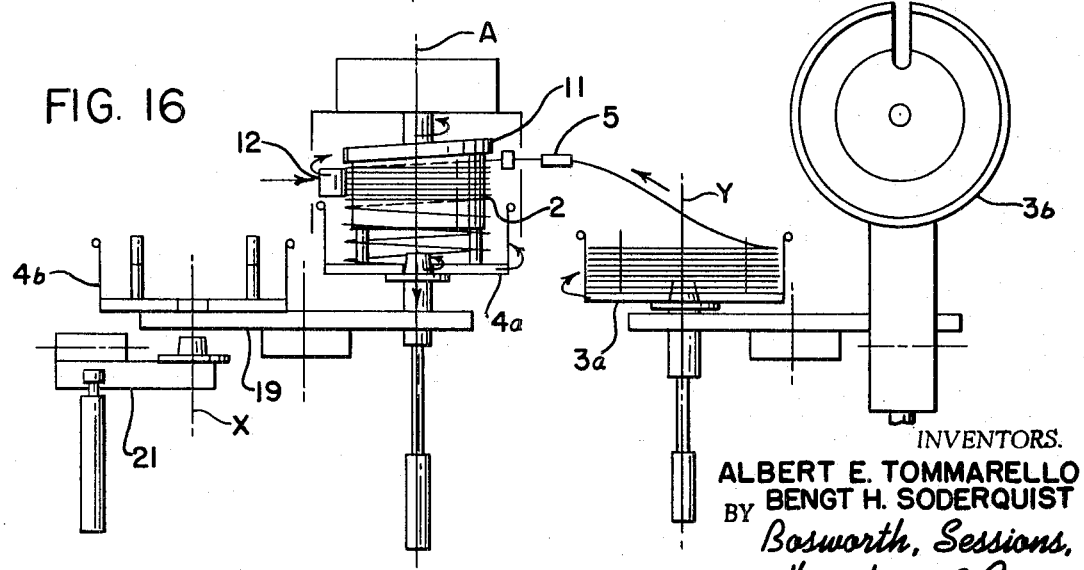

3,536,274
STRAND DRAWING AND HANDLING SYSTEM
Albert E. Tommarello, Pittsburgh, and Bengt H. Soderquist, Coraopolis, Pa., assignors to Blaw-Knox Company, Pittsburgh, Pa., a corporation of Delaware
Filed Oct. 22, 1968, Ser. No. 769,577
Int. Cl. B21c 47/24
U.S. Cl. 242—79                                                      12 Claims

ABSTRACT OF THE DISCLOSURE

Apparatus for handling and drawing strands, such as tubing, rod or wire, to reduce its cross section comprising strand payoff means that can receive a strand coil in a payoff tray in a loading position and move the coil-containing tray to a payoff position; strand drawing means including a die for drawing strand passing through it from the payoff tray, and a cantilever capstan or drum rotatable about an upright axis on which the strand leaving the die is level wound in a single layer and over the lower free end of which capstan the strand turns discharge; and strand receiving means including a receiving tray that can be positioned below the capstan, the tray having upstanding outer guard means that can surround the lower free end of the capstan and inner guard means that can be located at the lower end of the capstan, to define a generally annular channel into which the strand turns discharge to form a coil, the strand receiving means also including means for moving the receiving tray to a strand-receiving position below the drum and to an unloading position in which the coil can be unloaded. Conveyor means may transport a coil of drawn strand from the tray in the unloading position to a tray in the loading position.

CROSS REFERENCE TO RELATED APPLICATION

This application is related to copending applications Ser. No. 769,690 of James W. Schuetz, and Ser. No. 769,568 of James W. Schuetz and Edward I. Taylor, both filed on the same date as this application.

FIELD OF THE INVENTION

This invention relates to continuous strand drawing apparatus and more particularly to an apparatus in which relatively stiff strand such as long lengths of metal tubing, rod, or wire particularly of large diameter, are drawn through a die by a capstan or drum supported from one end and from which the strand is discharged over the free end of the capstan into a receiving tray.

DESCRIPTION OF PRIOR ART

In recent years there has been rapidly increasing need to draw long lengths of strand into strand of smaller cross section without damage to the strand. When the size reduction is substantial, this must be done by repetitive drawing since full reduction cannot be effected in a single step. The problem is rendered much more difficult when the strand is of relatively large diameter, because of increased stiffness of the strand and weight of coil.

One system widely used heretofore has involved the drawing of large diameter tubing on a series of draw benches, which require a great deal of space and can only produce tubing of limited lengths. Another system has involved the use of "bull blocks" on which a coil of tubing is drawn from a payoff tray to a die by a drawing drum to reduce diameter and increase tubing length; the coil of drawn tubing is then transferred by coil handling facilities from the drum to the payoff tray of the same or another bull block to further reduce the diameter and increase the length of the tubing, similar operations being carried out successively until tubing of the desired size has been produced. Much time is consumed in handling the coils of tubing; moreover a series of bull blocks and associated coil handling facilities constitute large and expensive apparatus occupying considerable expensive plant floor space.

Another system constituting providing an improvement in speed over the prior systems has involved the use of a single bull block and a large number of coil-carrying trays. Each tray is sequentially brought into a payoff position, from which the strand is drawn onto the bull block and discharged to another coil tray; after the drawing operation is completed, the filled coil tray is then moved onto a conveyor and another coil tray is moved into the payoff position and so on. The apparatus includes an extensive floor mounted conveyor system that supports a relatively large number of trays, moves each to payoff position and moves each away from receiving position. While this apparatus saves time, it requires sizable investments in trays, conveyor system, and plant space.

SUMMARY OF THE INVENTION

The invention overcomes these and other disadvantages and makes it possible for strand turns to be rapidly and, if desired, repetitively drawn by apparatus comprising strand payoff means for moving each of a plurality of payoff trays to a coil receiving position to receive a coil and then to a strand payoff position, a capstan or drum with an associated drawing die rotatable about an upright axis and having a lower free end, and strand receiving means for handling a plurality of receiving trays each having upstanding outer guard means and inner guard means that with the bottom of the tray define an annular channel in which turns of strand material discharged from the drum can collect in a coil; the strand receiving means moves each receiving tray into receiving position below the drum, raises and rotates it while a coil of drawn strand is formed, and then lowers and moves it to an unloading position from which the coil can be removed and if desired transported back by a conveyor to a payoff tray in the receiving position.

An object of the invention is the provision of such apparatus that overcomes the disadvantages of prior apparatus and makes possible rapid repetitive drawing of strand without damage to the strand or equipment, with safety to employees.

BRIEF DESCRIPTION OF THE DRAWINGS

These and other features, advantages and objects of the invention will become apparent from the following description of a preferred apparatus in connection with the accompanying drawings in which:

FIG. 7 is a fragmentary section, along line 7—7 of FIG. 1 but to an enlarged scale, showing one of the payoff trays with its drive means in its lowermost disengaged position;

FIG. 8 is a plan from line 8—8 of FIG. 7;

FIGS. 12 to 19 inclusive illustrate operations performed by the illustrated apparatus.

DESCRIPTION OF THE PREFERRED EMBODIMENT

General arrangement

Figure 1:
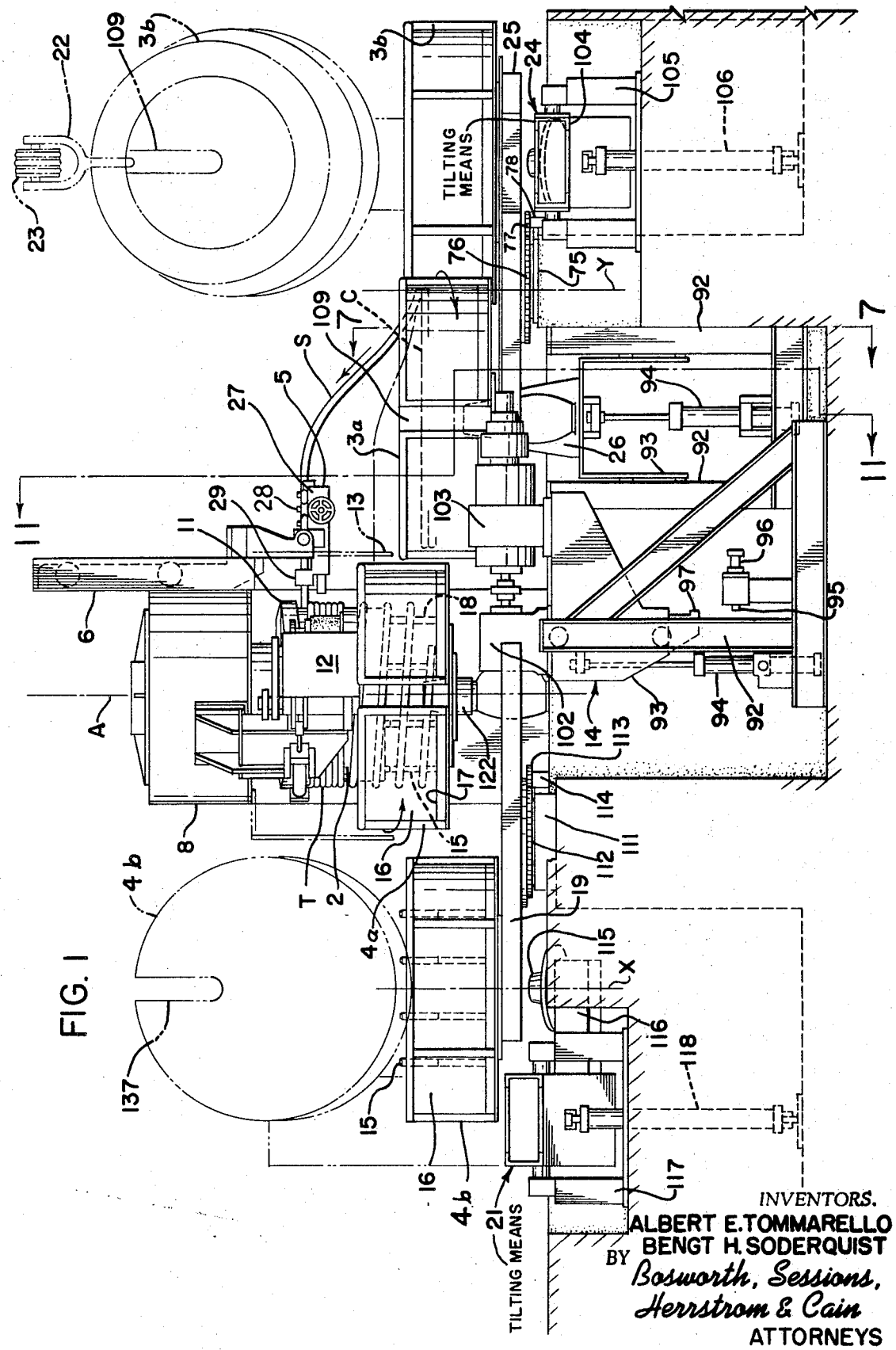
FIG. 1 is a front elevation of the apparatus as a whole, overhead conveyor means for transporting coils from a receiving tray to payoff tray being diagrammatically shown.

The illustrated apparatus (FIGS. 1, 2, 3 and 4) comprises a base 1 supporting a power-rotated capstan or drum 2 for rotation about an upright, preferably vertical, axis A at automatically controlled speeds and cycles of starting and stopping. A strand S to be drawn passes to the capstan or drum from a coil C, in one of the payoff trays 3a, 3b, that when in payoff position is supported and rotated about an upright preferably vertical axis to permit strand to unwind from the coil.

Below the capstan there is located one of the receiving trays 4a, 4b. When in receiving position this receiving tray can be raised to the position shown in full lines in FIGS. 1, and 4 and lowered to positions shown in broken lines in FIG. 11 and in full lines in other figures. Die means 5 for reducing the cross section of the strand is movable on guide means 6 of base 1 in an upright path, preferably parallel to axis A. The capstan is positively rotated as required by an electrical motor 7 through transmission 8.

Turns T are wound on the capstan in number to cause the strand S to engage the capstan with sufficient friction to prevent slippage as the strand is drawn through die means 5. A gripper 9 (FIG. 4) is mounted on the capstan to hold temporarily the leading end of the strand S, after it is passed through the die means, as the capstan is initially rotated.

When the gripper first grasps the leading end of the strand, the die means is in its lowermost position and the strand moves from the die means to the capstan in a straight path substantially normal to the capstan axis A. The die means then moves rapidly upwardly in its upright path while the drum is rotated a predetermined number of turns at a predetermined speed, controlled by suitable means, to cause a predetermined number of widely spaced turns of strand to wind initially in a single layer on the capstan. The die means is then in its uppermost position and the strand leaving the die means travels to the capstan in a straight path lying essentially in a plane normal to the capstan axis A.

Turns of strand thereafter winding on the capstan are moved toward its free end in a single layer by a plow 11 mounted to rotate with and about the capstan in a plane at a suitable angle other than normal to capstan axis A.

Hold down means 12 (FIGS. 1-4) is provided to be movable from a retracted position to one where it holds the turns of strand on the capstan after the strand is released from the gripper. A stationary guard 13 substantially surrounds the capstan and is supported from base 1.

Tray 4a in receiving position is raised and rotated by driving means 14 to receive first the released end of the strand, and then to receive and form into a coil the turns of strand discharged over the free end of the capstan. The tray has inner guard means 15 and outer guard means 16 and bottom 17. When the receiving tray is in its upper coil forming position, its outer guard means cooperates with the stationary guard and its inner guard means to define a generally annular zone through which the strand turns can pass from the capstan and form into a coil in the generally annular channel 18 defined by guard means 15 and 16 and bottom 17 of the tray.

As the capstan rotates, strand is drawn by the capstan through the die means from the coil-containing tray 3a or 3b in the payoff position, and is level wound on the capstan in a single layer of abutting turns that move axially of the capstan, and discharge over its free end with channel 18 of the receiving tray to form a coil. After a desired coil has been built in the receiving tray, usually by using the entire length of strand in the payoff tray, rotation of the capstan and receiving tray is halted, and the receiving tray carrying the coil of drawn strand is then lowered to its lowermost position onto member 19, where it clears the capstan.

Both receiving trays 4a and 4b are adapted to be supported on a member 19 rotatable about an upright and preferably vertical axis X to transfer the coil-containing receiving tray laterally away from under the capstan to a position where it can be unloaded. In this position, it is then tilted in an essentially upright position (FIGS. 1, 2, 11) by tilting means 21.

The drawn coil in such tray is then connected to known means 22 (FIGS. 1, 2, 11, 19) of an overhead conveyor 23, moved laterally out of the tray, and transported by the conveyor to a payoff tray 3b that is tilted upwardly by tilting means 24, to receive the coil laterally therein. This tray is then moved downwardly to a horizontal position by means 24 and placed on a transfer support 25 rotatable about upright preferably vertical axis Y. The tray containing the coil can, at a suitable time, be transferred to the payoff position by support 25, and while in such position is adapted to be lifted and rotated by a driving means 26 to permit payoff of the strand as it is drawn after having been pointed, passed through the die means and grasped by the gripper as described above; the cycle may be repeated as often as desired, with suitable changes of dies and other compensations for reduced strand size.

Die means and guide means

As shown in FIGS. 1, 2, 5 and 11, die means 5 comprises a conventional holder 27 that carries adjustable straightening rolls 28 and a die box 29 holding a changeable draw die 30. Holder 27 is mounted on a member 32 that can travel on guide means 6 in a path parallel to axis A of the capstan. In initial winding of the strand on the capstan, member 32 is moved upwardly by cylinder 33 (FIG. 11) at the proper rapid speed as the capstan rotates to level wind the strand on the capstan in the desired widely spaced turns. Cylinder 33 is controlled by conventional means.

Capstan and associated mechanism

As shown in FIGS. 1-4, the capstan 2 is fixed on a shaft 34 journaled in transmission 8, and comprises a hub 35 mounted on the shaft, one or more radial walls 36 rigidly fixed to the hub, and a generally cylindrical outer wall 37 fixed to wall 36.

Gripper 9 is known and comprises a member 38 pivotally mounted in the capstan and a member 39 pivotally mounted on member 38. Member 39 carries movable gripper jaws 40 suitably actuated by known means to grip the leading end of the strand as required. As shown in broken lines in FIG. 3, member 38 can swing to position 38' limited by stops 42, 43, where it projects beyond wall 37; and member 39 can swing to position 39' relative to member 38, limited by stops 44, 45; tension spring 39a biases member 39 to its straight position.

Latch means 46 (FIG. 3) of known construction, mounted in the capstan and operating between the gripper member 39 and the capstan, normally holds member 39 and its supporting member 38 in their innermost positions; the latch means is actuated to release the gripper when desired. When released, gripper members 38 and 39 may be pushed to their extended positions by fluid cylinder 47 controlled by conventional means.

A strand severing means 48 (FIGS. 3 and 4) is provided in the capstan to sever the strand end in the gripper from the remainder of the strand when the strand is to be released. Means 48, which is known, comprises normally open cutting blades 49 between which the strand extends. At the appropriate time these blades are caused to cut the strand by suitable linkage actuated by fluid cylinder 50 controlled by suitable known means.

Figure 2:
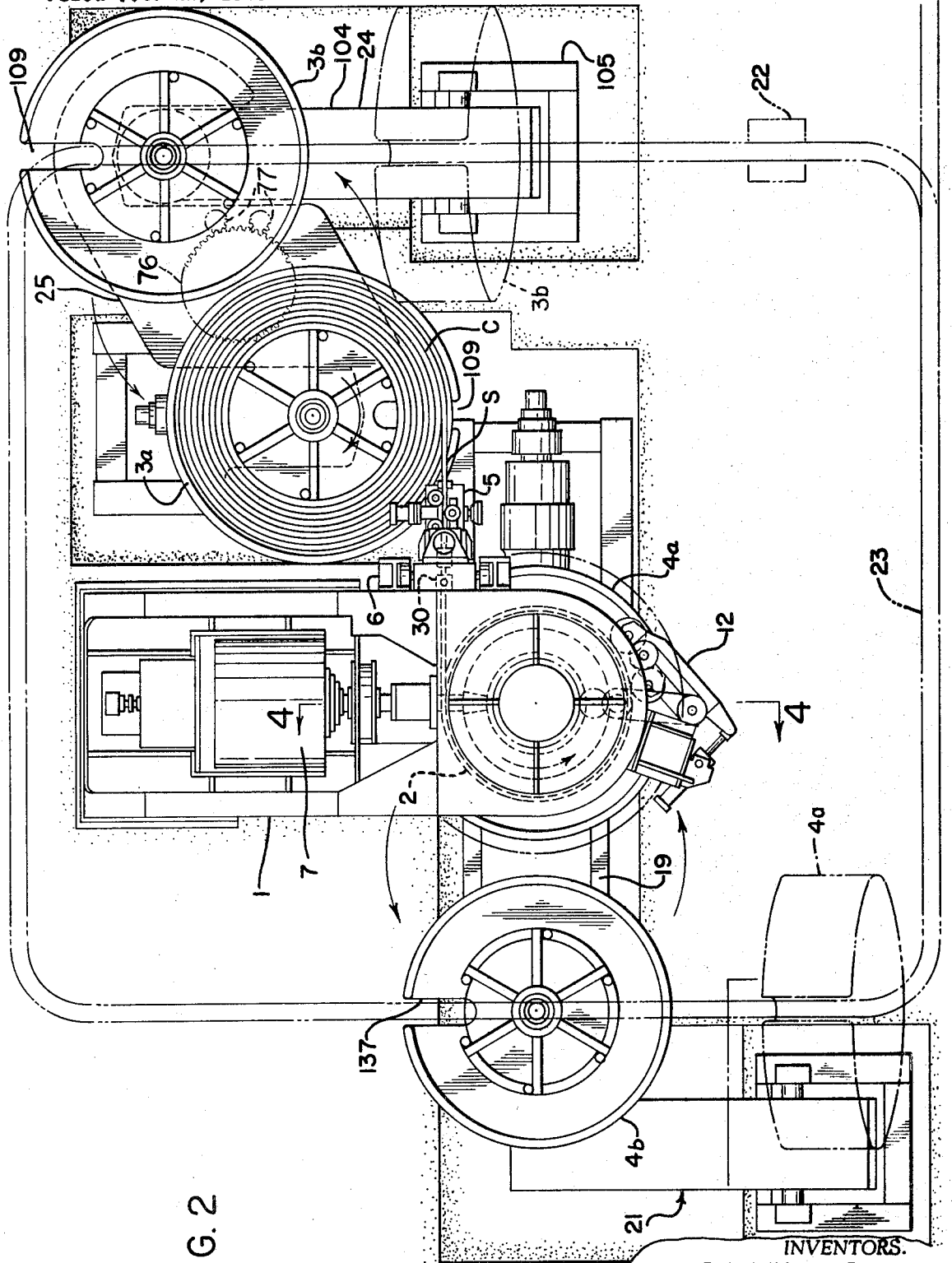
FIG. 2 is a plan of the apparatus of FIG. 1 to the same scale.

Strand hold-down means 12, located at the front of the capstan in FIGS. 1 and 2, comprises two elongated snubber rollers 52 (FIGS. 3 and 4) each surfaced with rubber or other resilient material. Each roller is long enough to extend over substantially the entire length of the capstan covered by abutting turns T. Each roller is mounted for rotation about an axis parallel to the capstan axis on a bracket 53 pivotally mounted on an arm 54 that itself is pivotally mounted about an axis parallel to the capstan axis on a support carried by base 1. Arm 54 can be moved at appropriate times between positions where the rollers engage the strand turns on the capstan and where they can clear such turns, by a fluid cylinder 56 actuated and controlled by suitable conventional means. Snubber rollers 52 are positively rotated by their gears 57 that engage intermediate gear 58 driven by pulleys 59 and belt 61 from a shaft 62 rotated by pulleys 63 and belt 64 through gears 65, 66 from a gear 67 mounted on the capstan drive shaft. The gears and pulleys are selected to provide the proper circumferential speed of the snubber rolls relative to the circumferential speed of the strand turns on the capstan.

Rotating plow

The roating plow 11 (FIGS. 1, 4) comprises a continuous annular plow ring 68 supported outside of and around the upper portion of the capstan by a radial member 69 rotatably mounted on a hub 71 by bearing means 72 so that member 69 and ring 68 rotate about an axis inclined to the axis A of the capstan. Ring 68 and member 69 are caused to rotate with the capstan by a pin 73 in the capstan and projecting into an opening 74 in member 69. The ring 68 therefore rotates in a fixed plane that is inclined to the axis of rotation of the capstan, the position, direction, and degree of inclination being such that when the strand S passes from the die means 5 to the capstan in a plane normal to the capstan axis A, the first turn of strand winding on the capstan clears the plow ring at the location where the strand first contacts the capstan and thereafter is engaged by the plow ring and is pushed axially of the capstan toward its free end. Each turn also pushes the next adjacent previously applied turn and so on, so that turns are level wound in a single layer and moved axially of the capstan as it rotates, and eventually discharged from over the free end of the capstan.

Stationary guard

Stationary guard 13 has a generally cylindrical inside surface and is supported by base 1. This guard is suitably apertured to clear the die means and hold down means and their supports. The guard is spaced radially from the capstan by substantial distance and substantially surrounds the portion of the capstan that carries turns; the guard also extends below the path of the strand passing to the gripper and below the free end of the capstan.

Payoff means

Figure 5:
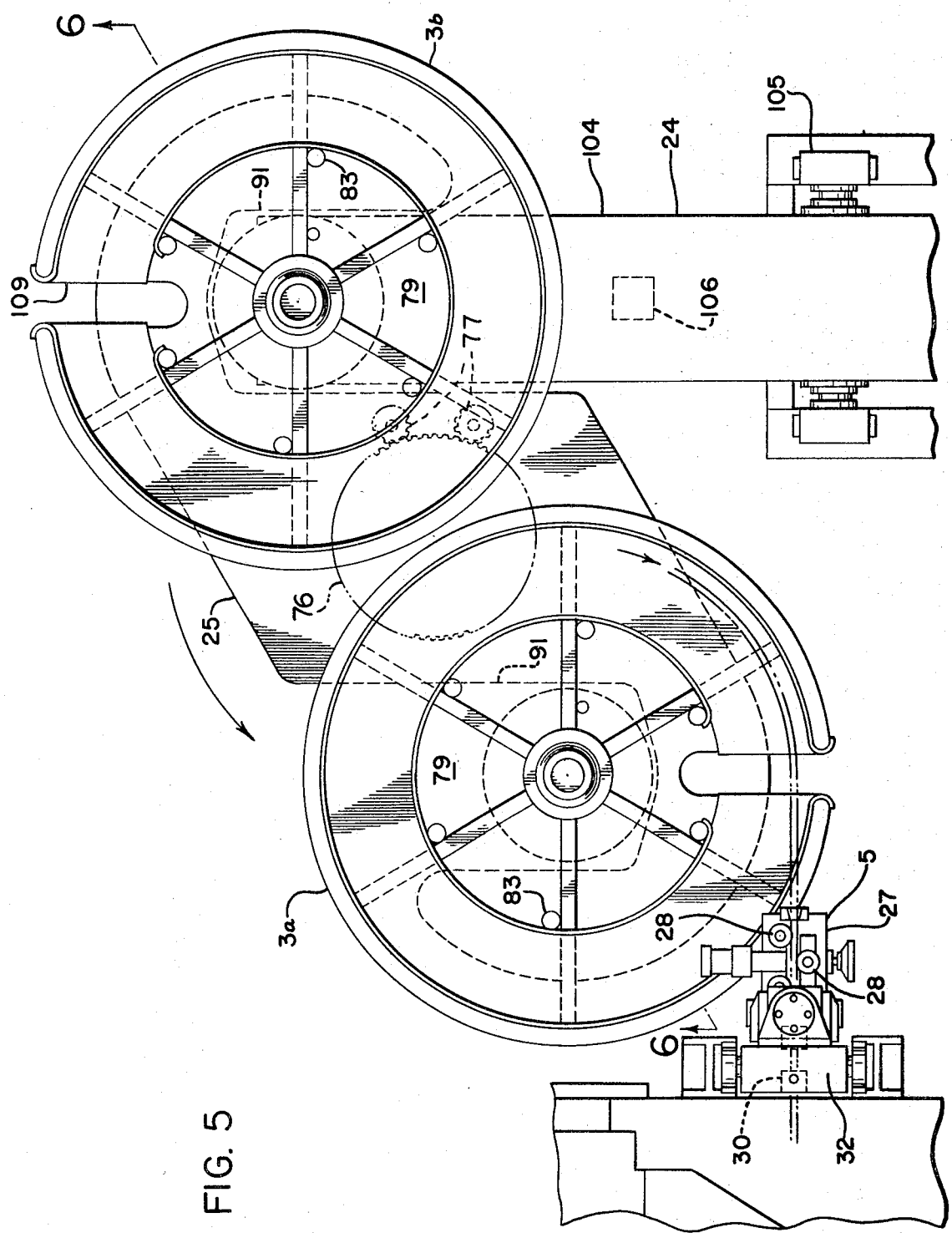
FIG. 5 is a plan enlargement of the strand payoff means at the right of the apparatus of FIGS. 1 and 2.

The payoff means (FIGS. 1, 2, 5, 6, 7, 8) comprises a stationary support 75 carrying generally horizontal member 25 for rotation about axis Y to transfer a tray 3a or 3b into the payoff position occupied by tray 3a and to move the other tray into loading position occupied by tray 3b in FIGS. 1 and 2. Member 25 is rotated thus by gear 76 driven by gears 77 powered by motors 78 (FIGS. 1, 5, 6).

Trays 3a, 3b are identical, each comprising (FIGS. 5, 6, 7) a base 79 having an axial hub 81 with a central opening 82. The base rigidly carries inner upstanding posts 83 and radially spaced outer upstanding posts 84, between which are fixed smooth surfaced walls 85, 86 and bottom 87, defining an open topped generally annular channel 88. A curved member 89 at the outer edge of outer wall 85 reinforces the tray and prevents damage to strand contacting the edge. Base 79 carries a driving pin 90 for limited slidable movement parallel to the tray axis; the pin being gravity biased downwardly when the tray is horizontal. More than the two payoff trays shown associated with member 25 may be used if desired. Member 25 has open ended apertures 91 extending beneath the tray.

Drive means 26 for lifting the tray in the payoff position from the member 25 and positively rotating it during payoff of strand from the tray includes (FIGS. 1, 6, 7) guide brackets 92 that support for upright and preferably vertical movement member 93 movable between upper and lower positions by the piston rod of fluid cylinder 94 conventionally controlled and actuated. A latch 95, moved by fluid piston 96, engages under keeper 97 to lock member 93 in the upper position when desired. Member 93 supports a driven head 98 for rotation about an axis that essentially coincides with the axis of the tray when in the payoff position. Head 98 includes a horizontal base 99 having an upper high friction surface that can engage and support base 79 of the tray, an upward hub 100 having a lower cylindrical surface that closely fits opening 82 in the tray hub and a tapered end portion that aids in guiding hub 100 into such opening. Base 99 has openings 101 to engage the tray pin 90. Head 98 is journaled in gear box 102 on member 93 and rotated by electric motor 103 energized and controlled by suitable conventional means.

Figure 6:
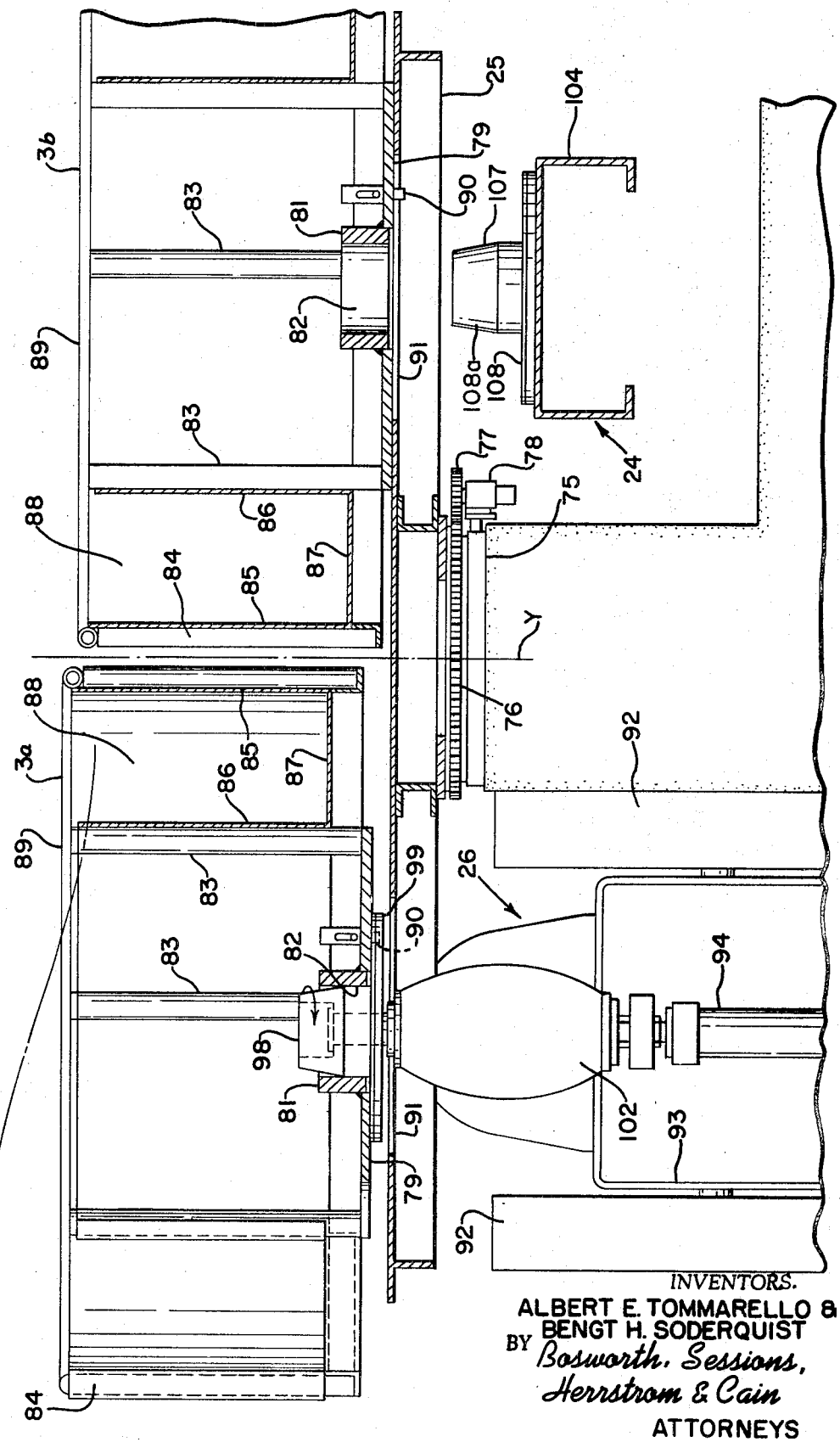
FIG. 6 is a sectional elevation along line 6—6 of FIG. 5 to a larger scale.
Figure 9:
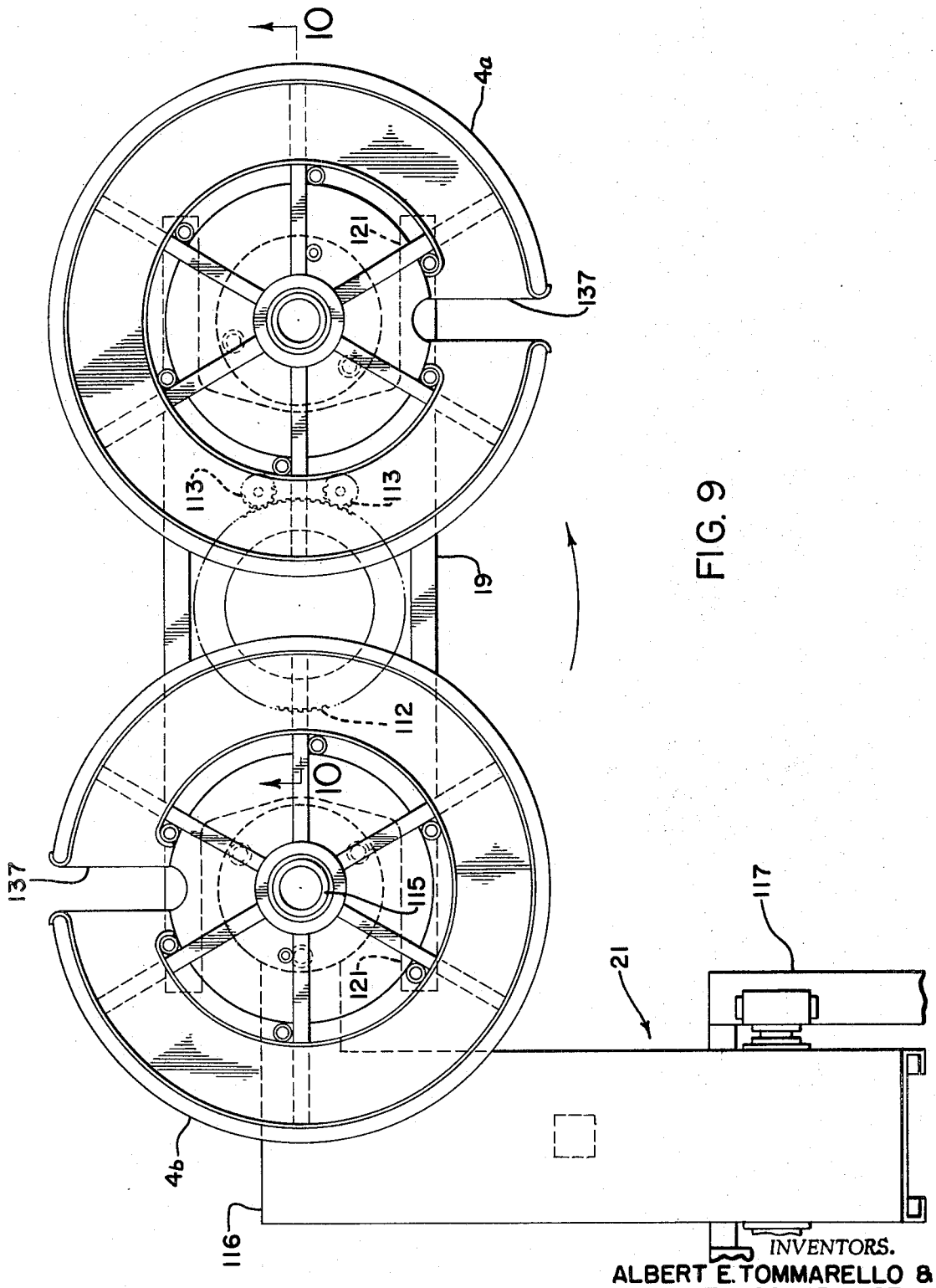
FIG. 9 is a plan enlargement of the strand receiving means disposed below and to the left of the capstan in FIGS. 1 and 2.

When a payoff tray is in payoff position on member 25 and strand payoff is to begin, member 25 is raised until its head 98 extends through associated opening 91 of member 25 to engage the tray hub and lift the tray from the member 25 (FIGS. 6 and 7). The head is then rotated to cause pin 90 to drop into an opening 101 in head 98 to aid in positively rotating the tray. When it is paying off strand, therefore, the tray is supported free of member 25 and positively rotated to permit strand to pass freely to the die means.

The means 24 for lifting a tray in the loading position from member 25 and tilting it so the tray is upright comprises (FIGS. 1, 5–8) a member 104 pivotedly mounted on a stationary support 105, and movable from a generally horizontal position to an upright position by a fluid cylinder 106. This pivoted member 104 rigidly carries at its free end an upright tray-engaging portion 107 having a base portion 108 and projecting hub 108a with a cylindrical side and a tapered end. When the end of member 104 carrying the tray portion 107 is raised, hub 108a is guided into and closely fits into hub of the tray, and base 108 supports the tray so it is swung to a generally upright position, preferably at the angle shown in FIG. 11 for a receiving tray in its tilted position. Each payoff tray is slotted at 109 as shown in FIGS. 2 and 5. The tray can be manually rotated on portion 107, or the means 26 for positively driving the payoff tray may be such that it halts rotation in a position such that when the payoff tray is transferred by member 25 to loading position and tilted to its upright position slot 109 is uppermost on the tray, so a coil carried by overhead conveyor means can be readily moved laterally into channel 88 of the tray. To facilitate this when the tray is in its upright position, it is preferably tilted from the vertical so that its open side is tilted slightly upward to facilitate reception of the coil. After the tray has received the coil, tilting means 24 is actuated to lower the tray on member 25 which transfers the tray to the payoff position when required. When both trays rest on member 25, the tilting means 24 and drive means 26 in their lower positions clear member 25 so it can rotate; and because of the design of the open ended apertures 91, even if either or both trays are lifted from member 25 by either or both such tilting means and driving means, member 25 can be rotated.

Strand receiving means

The strand receiving means is generally similar to the payoff apparatus but has significant differences, particularly with reference to design of the receiving trays and their cooperation with the capstan.

As shown in FIGS. 1, 2, 9–11, such means comprises a generally horizontal member 19 shown as carrying two receiving trays 4a, 4b, although it could be designed to carry more. This member is mounted for rotation about axis X on a stationary supporting member 111. Member 19 is adapted to be rotated to transfer each tray sequentially into the strand receiving position at which tray 4a is shown in FIGS. 1 and 2, and to the coil unloading position occupied by tray 4b in these figures. This is accomplished by gear 112 on member 19, and pinion gears 113 driven by motors 114.

Figure 11:
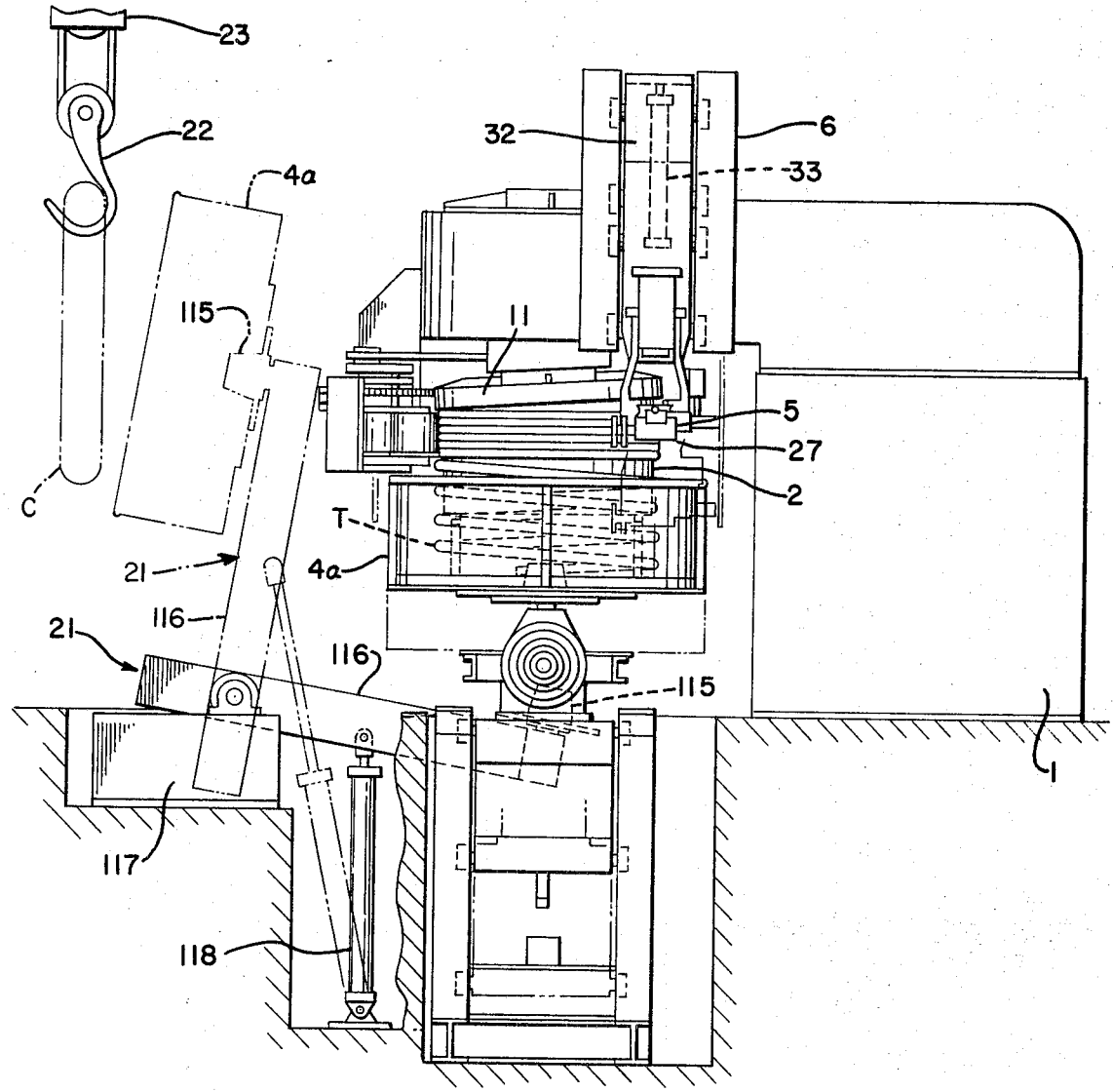
FIG. 11 is a section along line 11—11 of FIG. 1 showing one of the receiving trays below the capstan in strand-receiving position in full lines, and in its lowered position in broken lines, and also in broken lines showing a receiving tray tilted upright in unloading position to permit ready removal of a coil of drawn strand.

The strand receiving means includes means 21 for tilting the tray when it is in unloading position. Means 21 includes tray engaging portion 115 mounted on the offset end of member 116 that is pivotally mounted on stationary member 117 and is movable by conventionally actuated fluid cylinder 118 to lift the tray from member 19 and tilt it to an upright position where the open end of the tray faces upward slightly as shown in FIG. 11. Member 19 has open ended apertures 121 for this and other purposes. Thereafter after a coil in the tray has been removed by the overhead conveyor, the empty tray can be lowered to place the tray on member 19 so that it can at the appropriate time be transferred into strand receiving position.

Means 14 for driving the tray when it is in strand receiving position is also included in the strand receiving means. Means 14 includes a drive head 122 adapted to be located in a lower position to member 19 and to be raised to upper positions to engage the tray 4a or 4b in the strand receiving position and lift it from member 19 and positively rotate it.

The means 14 for so supporting and driving the head 122, may be structurally essentially identical with means 26 discussed above in connection with the performance of similar functions for the payoff tray in the payoff position, so no further description is provided; for convenience identical parts are numbered identically for these portions of the apparatus.

Receiving trays 4a and 4b are identical; each comprises a base 119 having an axial hub 123 with central opening 124. Base 119 rigidly carries upstanding inner posts 125 constituting inner guard means 15, outer posts 126 and side wall 127 that comprise outer guard means 16 and that with the inner guard means and bottom wall 128 define annular channel 18 in which the coil is built up from turns of strand discharged from the free end of the capstan. A member 129 at the top of the outer guard means provides reinforcement and a rounded edge to prevent damage to the strand if it should contact.

Figure 4:
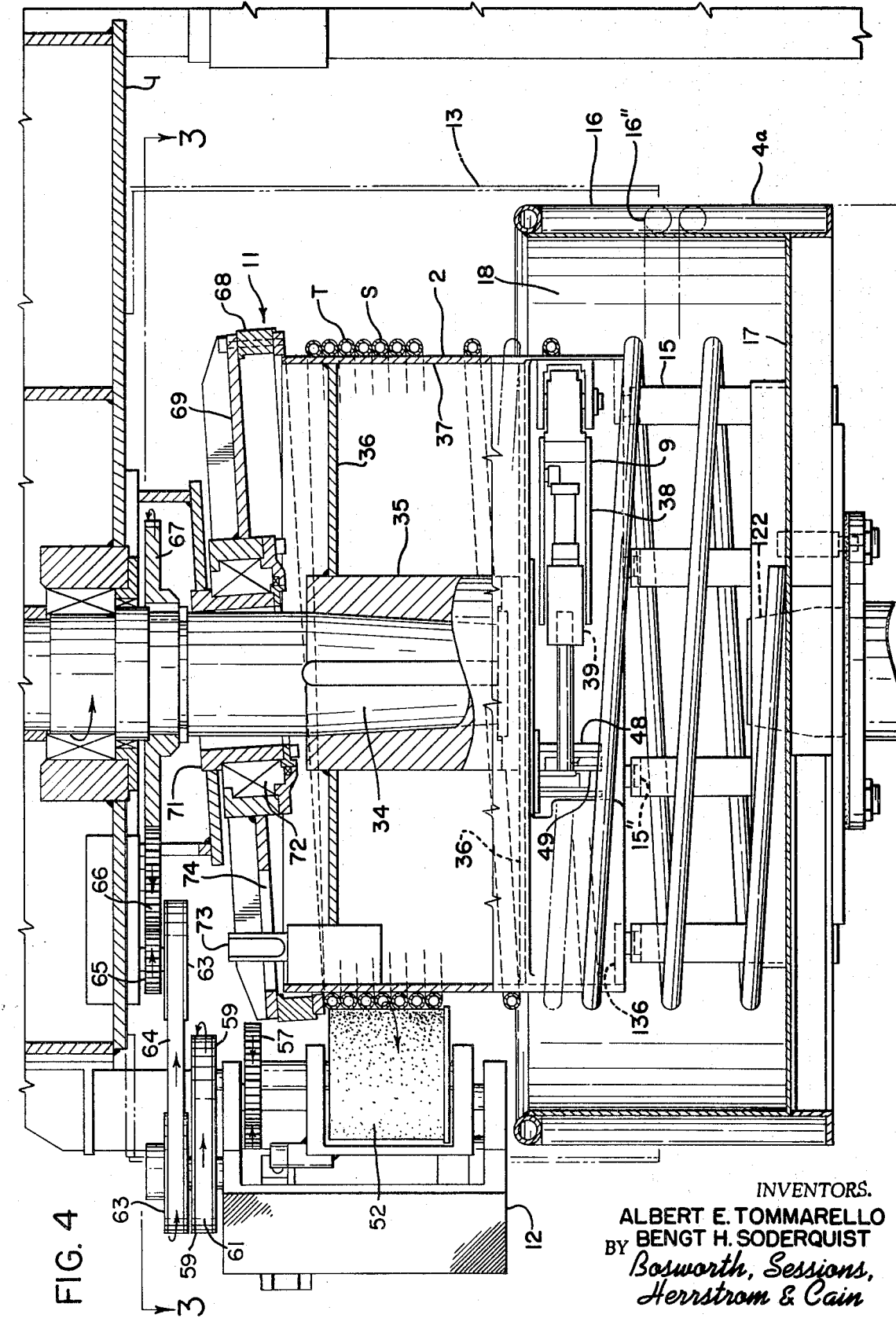
FIG. 4 is a section of the portion of FIG. 3 to the same scale, along line 4—4 of FIG. 2, a receiving tray being shown in its uppermost position to receive the first turns of strand discharged after the strand is released from the gripper.
Figure 10:
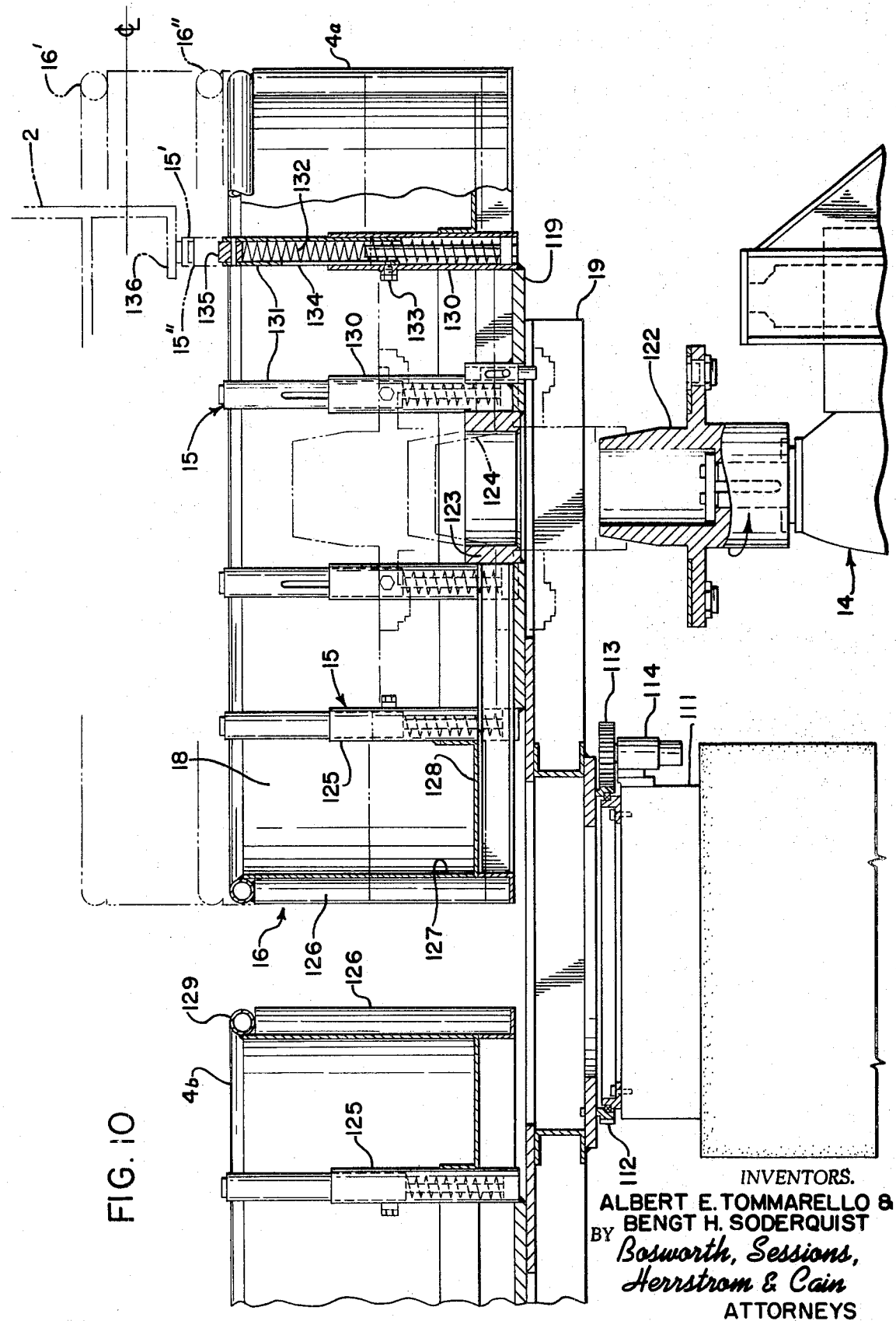
FIG. 10 is a section along line 10—10 of FIG. 9 but to a larger scale.

Each of the inner posts 125 is of telescoping construction comprising a base tubular member 130 in which is slidably mounted a telescoping member 131 that is biased upwardly and outwardly by a compression spring 132 operating between the bottoms of members 130 and 131. Member 131 is limited in its travel by stud 133 threaded in the side of the base tubular member and extending into a slot 134 of the member 131. Each member 130 is tipped with an insert 135 of hard wear-resistant metal. The dimensions of posts 125 are such that the free ends of the fully extended telescoping members 131 project slightly above the top of outer guard means 16. The annular channel 18 is dimensioned so that it will receive the strand turns discharged from the capstan and build them into a coil. Moreover, inner posts 125 are so positioned radially that their upper ends will engage an end wall 136 of the capstan near the outer periphery of the capstan and the outer guard means is so located that it will fit within the stationary guard 13 surrounding the capstan (FIGS. 4, 10). Each receiving tray also has a slot 137 (FIGS. 2, 9) in its outer wall and bottom so that when it is tilted to its coil unloading position the grasping means 22 of the overhead conveyor can enter the slot to hold the coil and remove it.

When both trays rest on member 19, the drive means 14 and tilting means 21 in their lowering positions clear the transfer member 19 so it can rotate; and the apertures 121 in member 19 and the tilting and drive means are so designed and located that the tilting and drive means can raise the trays without interference from member 19.

OPERATION

It is assumed that the apparatus is properly set up and adjusted for the particular size of strand to be handled, as by provision of the proper die, the proper adjustment of the gripper to suit the strand, and proper size and adjustment of rolls 28 on the die means. Die means 5 is in its lowermost position and gripper 9 is in its extended position as shown in broken lines in FIG. 3.

Moreover, in the strand payoff means, member 25 is angularly located so that payoff trays 3a, 3b on member 25 are located one with its hub above and aligned with the drive head 98 of the drive means 26 and the other where it can be engaged by tray engaging portion 107 of the tilting means 24. Head 98 and tray engaging portion 107 are both in their lowermost positions so they clear member 25 and the trays.

In the strand receiving means, member 19 is angularly located so that one of the receiving trays 4a, 4b carried by it is located with its hub above and aligned with drive head 122 of tray drive means, while the other tray is located so its hub can be engaged by tray engaging portion 115 of the tilting means 21. Head 122 and portion 115 are in their lowermost positions so they clear member 19 and the trays.

Figure 12:
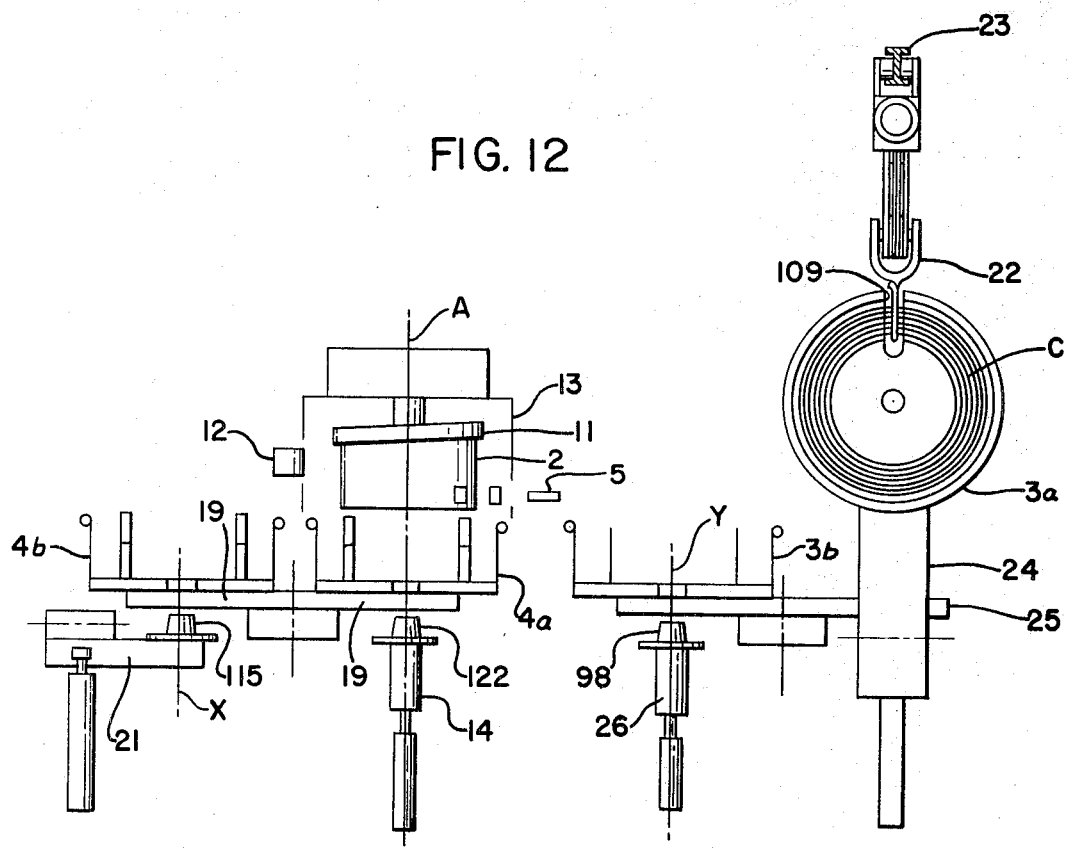

The tilting means 24 in the payoff means is then actuated to engaged the hub of the payoff tray in the coil receiving position and tilt the tray upwardly with its slot 109 in the uppermost position. The overhead conveyor 23 is actuated to bring a coil C and deposit it in the channel 88 of the tilted tray, slot 109 facilitating entrance of coil gripper 22 for the purpose (FIG. 12), after which the coil is released by the conveyor.

Figure 13:
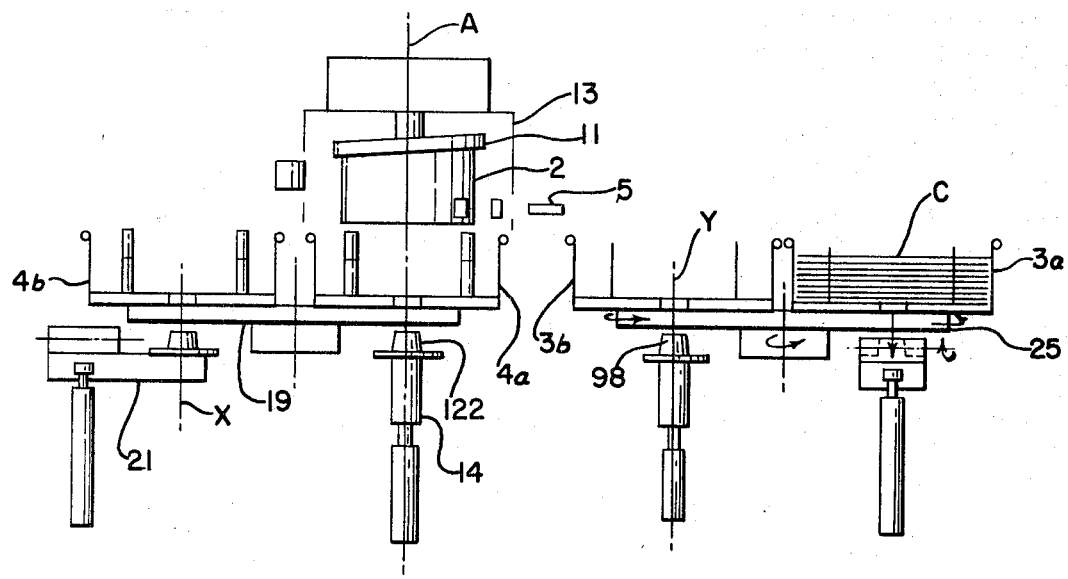

Tilting means 24 is then actuated to deposit the tray on the member 25 (FIG. 13), which is then caused to rotate to transfer the coil-containing tray 3a or 3b into the position where its hub is axially aligned with and above drive head 98, the other tray being moved to the position initially occupied by the tray that received the coil. The leading end of the strand S from the coil C in the payoff tray is suitably prepared for drawing by being pointed, and then passed through the straightening rolls 28 and manually or by suitable conventional mechanical means through the die 30 of the die means 5 while it is in its lowermost position, after which it is inserted into gripper 9 which is then actuated to grasp the strand end (FIG. 14).

Payoff tray drive means 26 is then actuated to raise the head 98 to engage the hub of the tray in the payoff position to lift it from member 25. Capstan 2 is then rotated in counterclockwise direction and the payoff tray in the clockwise direction by their drive means, the driving pin 91 of the tray engaging a hole 101 in head 98 positively to drive the tray. Initially, the rotational speeds are relatively slow, while the die means 5 is rapidly raised by cylinder 33 to traverse the capstan and cause the strand to wind on the capstan in the predetermined number of widely spaced turns until the last turn on the strand contacts the plow 11 and the strand passes from the die means to the capstan in a plane normal to the axis of rotation of the capstan. The die means is then halted and maintained in this upper portion.

Figure 3:
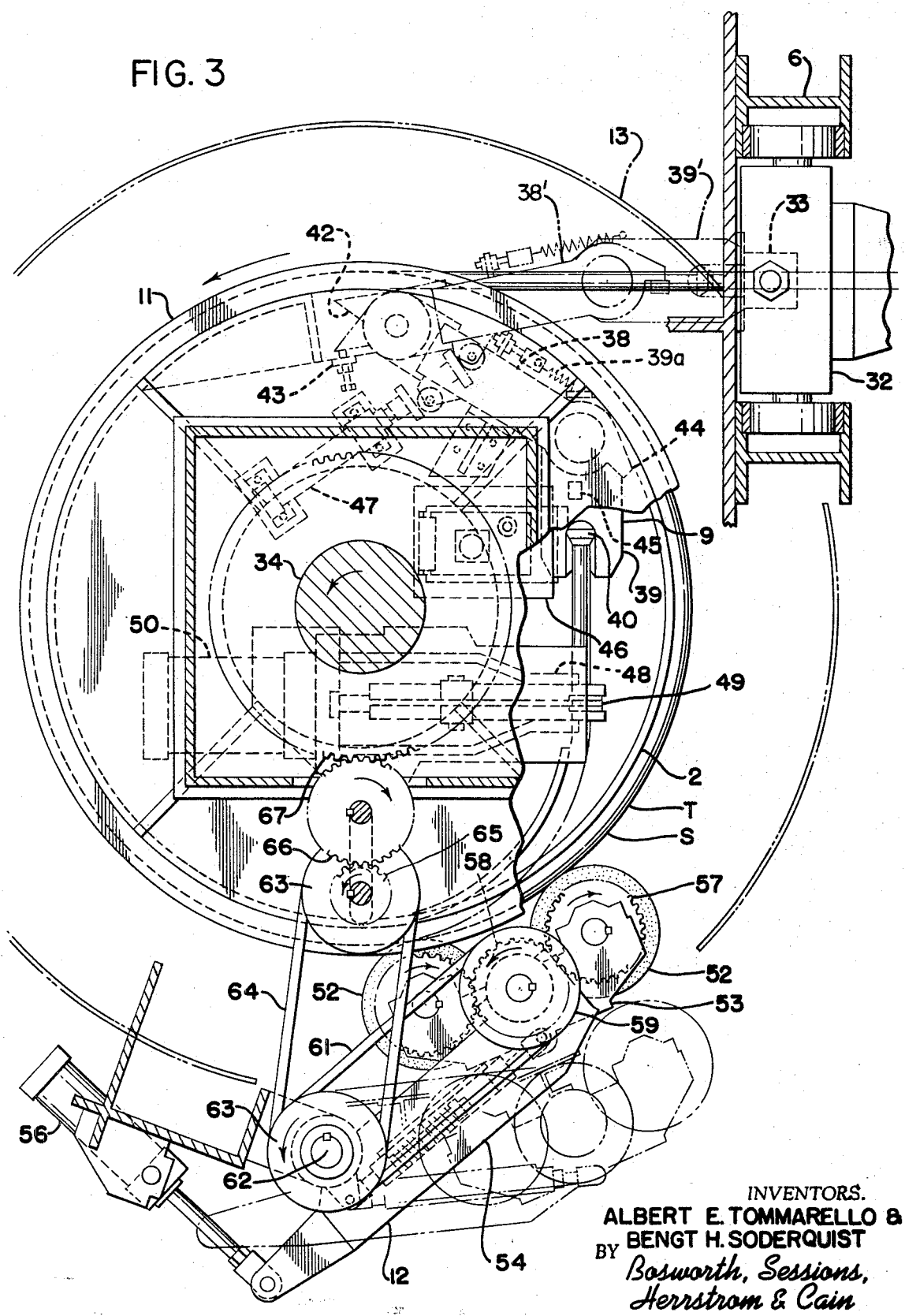
FIG. 3 is an enlarged sectional view along line 3—3 of FIG. 4, showing in plan the capstan and associated apparatus.

As soon as the first turn of strand starts to wind on the capstan, it moves the gripper to its innermost position shown in full and dotted lines in FIG. 3, in which it is locked by latch means 46.

As soon as the die means raises sufficiently as it winds the initial strand turns on the capstan, drive means 14 for the receiving tray below the capstan is actuated to raise its drive head 122 so it engages the hub of the tray and lifts the tray with the top edge of its outer guard means 16 is substantially above the horizontal plane in which the free end of the strand is gripped by the gripper and above the lowermost path of travel of the strand at the beginning of the initial winding operation, while the ends of the telescoping members of the inner posts contact the bottom of the capstan and are moved inwardly of the posts as the receiving tray is lifted as shown in full lines in FIGS. 1, 4, 11 and 15, and in broken lines 15' and 16' in FIG. 10. The drive head 122 is rotated, causing the tray driving pin 90 to engage a hole in the drive head and positively rotate the tray. At this stage both the capstan and tray are rotated at the same relaively slow angular speed.

Strand severing means 48 is then actuated to release the strand from the gripper, and the newly formed free end of the strand and the succeeding turns then drop into the annular channel 18 of the receiving tray (FIG. 16). Since the receiving tray is raised so the top edge of its outer guard means is within and substantially above the bottom edge of the stationary guard 17 and so its inner guard posts contact the capstan, there is provided a completely shielded annular zone through which the free end and the initially discharged turns of the strand can be guided into and dropped into the channel 18.

Figure 17:
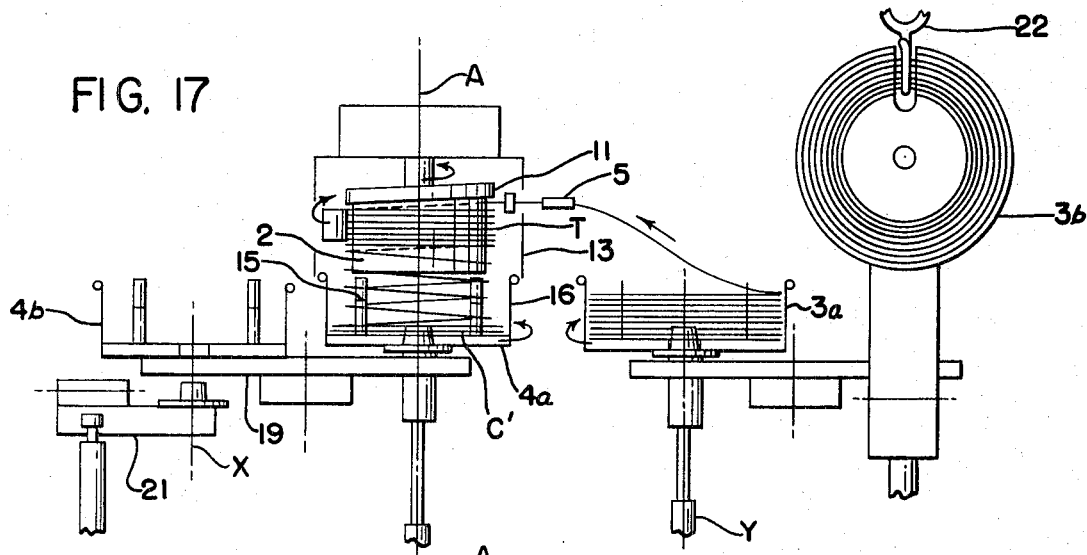

Thereafter, the receiving tray is lowered until the upper edge of its outer guard means 16 is near but above the lower portion of the stationary guard 13 and slightly below the bottom of the capstan, and the upper ends of the inner guard posts are slightly below the bottom of the capstan in full lines in FIG. 17 and in broken lines 15" and 16" in FIGS. 4 and 10. Thereafter the rotational speeds of the capstan and the receiving tray are substantially increased, the speeds being essentially identical.

Strand is thus drawn from coil C in the payoff tray in payoff position through the die means 5 while it is in its uppermost position, passes to the capstan in a straight path lying essentially in a plane normal to the axis of rotation of the capstan, is level wound on the drum in a single layer of turns that are advanced axially of the capstan downwardly toward its free end and drop in sequence from the capstan into the annular channel 18 of the receiving tray to form a coil C'. The overlapping of the outer guard means 16 and stationary guard 13, and the close proximity of the inner guard means 15 to the bottom of the capstan provide a shielded annular zone that prevents entangling or catching of the strand as it forms the coil C'. The capstan is rotated and the strand is thus drawn until all of the strand of the payoff tray has been drawn, wound onto the capstan, and discharged from the capstan to form the coil C'.

Figure 18:
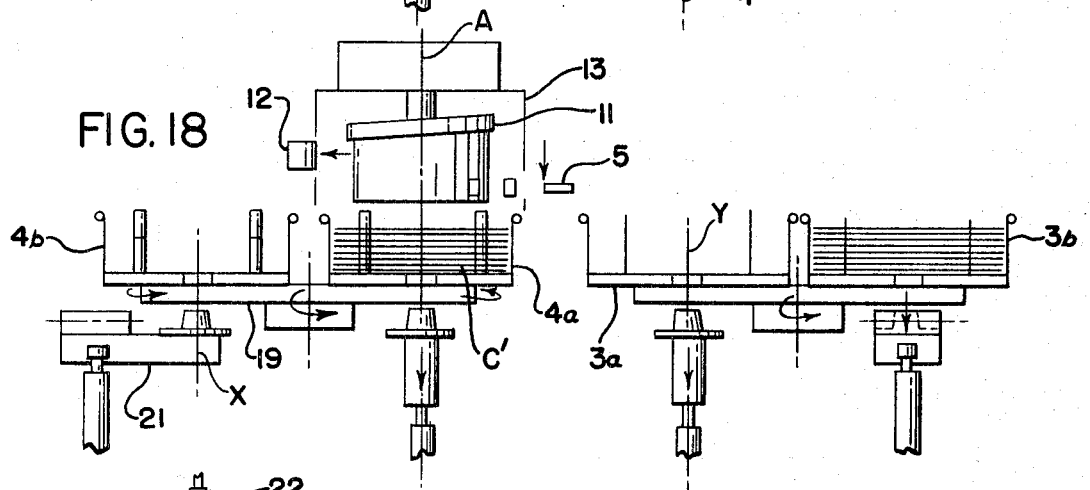

Rotation of the capstan and receiving tray are halted, the hold down means is retracted, and the tray is lowered so the coil-containing receiving tray rests on transfer member 19 and all portions of the receiving tray clear the capstan and the stationary guard. Drive means 14 and tilting means 21 are also retracted to clear the trays and member 19. Member 19 is then rotated about its axis (FIG. 18) until the positions of the coil containing receiving tray and the empty receiving tray are interchanged.

Figure 19:
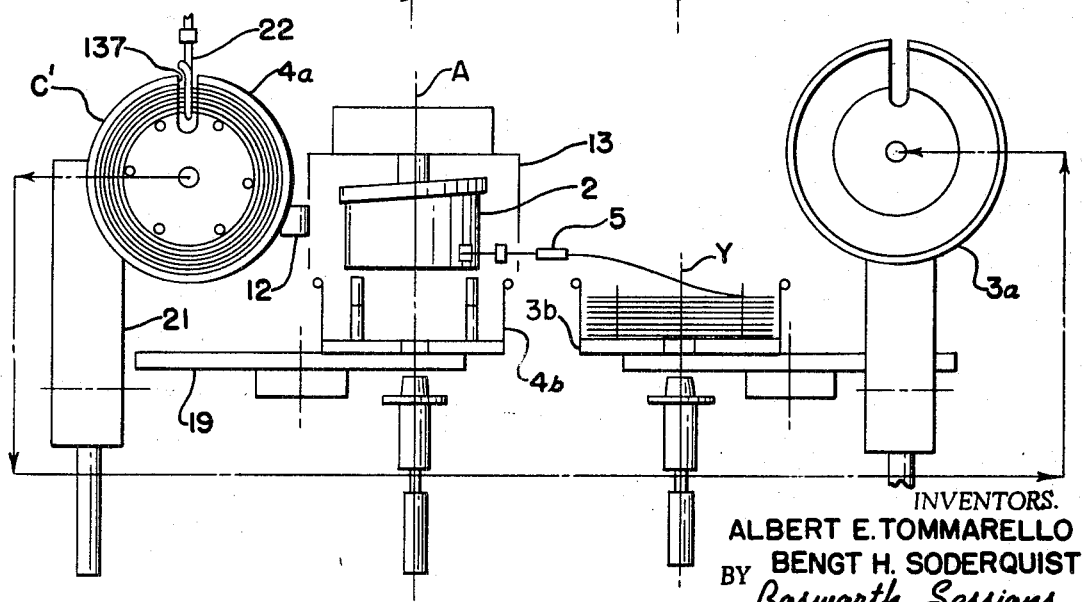

The empty receiving tray is then positioned to receive strand turns from the drum, while the coil-containing receiving tray is engaged by means 21 and tilted to the position shown in FIGS. 11 and 19 with its slot 137 uppermost, so that the coil gripper 22 of the overhead conveyor can enter the slot and readily engage the coil and move it laterally out of the upright receiving tray. Thereafter the coil can be moved by the conveyor away from the apparatus into inventory or, as is more likely, can be moved to the other end of the apparatus so it can be inserted into the payoff tray which is tilted upwardly to its coil receiving position.

The sequence of operations in many cases can overlap. Thus the coil can be transferred from a tilted receiving tray to a tilted payoff tray while or after the operations of pointing, gripping and starting up the strand on the capstan above the strand and drawing are carried out.

The invention thus makes possible high production drawing apparatus capable of repetitively drawing strand in a limited plant space, that is capable of drawing relatively large diameter strand because of the automatic features of this coil handling apparatus, and that is safe to personnel and exceptionally free of damage to product. Although the illustrated embodiment has been described in connection with the drawing and handling of a strand such as a tube, it is obvious that such apparatus may be used for handling other types of strand such as rods or even wire.

Those skilled in the art will appreciate that various changes and modifications can be made in the apparatus and method described herein by way of example, all without departing from the spirit or scope of the invention. The essential characteristics of the invention are defined in the appended claims.

What is claimed is:

1. Apparatus for handling relatively stiff strand comprising strand payoff means including means for sequentially moving each of a plurality of payoff members each adapted to carry a coil of strand, to a coil receiving position and then to a strand payoff position; means for treating the strand comprising a drum rotatable about an upright axis and having a lower free end, said drum having a periphery on which turns of strand are wound and discharged downwardly over the free end of said drum; and strand receiving means comprising means for sequentially moving each of a plurality of receiving members, each adapted to receive strand turns discharged over the free end of said drum and form them into a coil, into a strand receiving position under the drum where it can receive strand and form it into a coil and then to a coil unloading position from which the coil can be removed from said member.

2. The apparatus of claim 1 in which said strand payoff means includes means for moving each payoff member to an upright position when it is in coil receiving position to facilitate placing of the coil therein, and for positioning each of said members in a generally horizontal position when it is in a payoff position.

3. The apparatus of claim 2 in which said coil receiving position and said strand payoff position are laterally displaced and in which said strand payoff means includes means for moving said payoff members laterally between said positions.

4. The apparatus of claim 1 in which said strand receiving means includes means for sequentially positioning each receiving member in a generally horizontal strand receiving position below said drum with its axis essentially coincident with the axis of rotation of said drum so it can receive strand turns discharged over the free end of said drum and form a coil, and for moving each receiving member to an upright position when it is in coil unloading position to facilitate removal of a coil therefrom.

5. The apparatus of claim 4 in which said strand receiving position and said coil unloading position are laterally displaced and in which said strand receiving means includes means for moving said receiving members laterally between said positions.

6. The apparatus of claim 1 in which said payoff means includes means for moving each payoff member upright when it is in coil receiving position to facilitate placing of the coil therein, and for positioning each of said members in a generally horizontal position when it is in a payoff position; and in which said strand receiving means includes means for sequentially positioning each receiving member in a generally horizontal strand receiving position below said drum with its axis essentially coincident with the axis of rotation of said drum so it can receive strand turns discharged over the free end of said drum and form a coil, and for moving each receiving member to an upright position when it is in coil unloading position to facilitate removal of a coil therefrom.

7. The apparatus of claim 6 in which in said strand payoff means said coil receiving position and said strand payoff position are laterally displaced and in which said strand payoff means includes means for moving said payoff members laterally between said coil receiving and strand payoff positions; and in which in said strand receiving means said strand receiving position and said coil unloading position are laterally displaced and in which said strand receiving means includes means for moving said receiving members laterally between said positions.

8. The apparatus of claim 1 in which said strand payoff means includes means for positively rotating the payoff member when it is in payoff position at a speed that causes the unwinding strand essentially to match the circumferential speed of the drum.

9. The apparatus of claim 1 in which said strand receiving means includes means for positively rotating the receiving member in its strand receiving position at a rotational speed that is substantially the same as the rotational speed of said drum.

10. The apparatus of claim 1 in which said strand payoff means comprises a supporting member adapted to support a plurality of strand payoff members, said supporting member being movable to move each of said payoff members between a coil receiving position and a strand payoff position while said payoff members are generally horizontal; means for lifting the payoff member in the coil receiving position from said supporting member and tilting it in a generally upright position, and means for engaging the payoff member in the strand payoff position, lifting it from said supporting member, and positively rotating it while it is generally horizontal.

11. The apparatus of claim 1 in which said strand receiving means comprises a supporting member adapted to support a plurality of receiving members, said supporting member being movable to move each of said receiving members between a strand receiving position and a coil unloading position while said receiving members are generally horizontal; means for engaging the receiving member in the strand receiving position, lifting it from said supporting member, and positively rotating it at substantially the same speed as said drum, and means for lifting the receiving member in the coil unloading position from said supporting member and tilting it to a generally upright position.

12. The apparatus of claim 1 in which said strand payoff means comprises a first supporting member adapted to support a plurality of strand payoff members, said supporting member being movable to move each of said payoff members between a coil receiving position and a strand payoff position while said payoff members are generally horizontal, means for lifting the payoff member when it is in the coil receiving position from said supporting member and tilting it to a generally upright position, and means for engaging the payoff member in the strand payoff position, lifting it from said first supporting member, and positively rotating it; and in which said strand receiving means comprises a second supporting member adapted to support a plurality of receiving members, said supporting member being movable to move each of said receiving members between a strand receiving position and a coil unloading position while said receiving members are generally horizontal; means for engaging the receiving member in the strand receiving position, lifting it from said second supporting member, and positively rotating it at substantially the same speed as said drum, and means for lifting the receiving member in the coil unloading position from said supporting member and tilting it to a generally upright position.

References Cited
UNITED STATES PATENTS

| | | | |
|---|---|---|---|
| 2,202,883 | 6/1940 | Yoder | 242—80 |
| 2,527,667 | 10/1950 | Wood | 242—79 |
| 3,098,621 | 7/1963 | Nelson et al. | 242—79 |

NATHAN L. MINTZ, Primary Examiner